(12) United States Patent
Yamamoto et al.

(10) Patent No.: US 7,034,646 B2
(45) Date of Patent: Apr. 25, 2006

(54) MULTILAYER CERAMIC ELECTRONIC COMPONENT, MULTILAYER COIL COMPONENT AND PROCESS FOR PRODUCING MULTILAYER CERAMIC ELECTRONIC COMPONENT

(75) Inventors: Takahiro Yamamoto, Otsu (JP); Yasushi Saito, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/515,987

(22) PCT Filed: Apr. 28, 2004

(86) PCT No.: PCT/JP2004/006223

§ 371 (c)(1),
(2), (4) Date: Nov. 23, 2004

(87) PCT Pub. No.: WO2005/004177

PCT Pub. Date: Jan. 13, 2005

(65) Prior Publication Data

US 2005/0179514 A1    Aug. 18, 2005

(30) Foreign Application Priority Data

Jul. 4, 2003    (JP) ............................. 2003-192069

(51) Int. Cl.
*H01F 5/00* (2006.01)
(52) U.S. Cl. ..................................... 336/200
(58) Field of Classification Search .................. 336/83, 336/200, 206–208, 223, 232–3; 361/792–803; 428/210
See application file for complete search history.

(56) References Cited

FOREIGN PATENT DOCUMENTS

| JP | 10-270249 | 10/1998 |
|----|-----------|---------|
| JP | 11-297543 | 10/1999 |
| JP | 2002-134355 | 5/2002 |
| JP | 2002-252117 | 9/2002 |

*Primary Examiner*—Tuyen T Nguyen
(74) *Attorney, Agent, or Firm*—Keating & Bennett,LLP (57) ABSTRACT

A laminated coil component includes an inner ceramic green sheet having a plurality of conductive coil patterns, a conductive lead pattern, and interlayer-connecting via holes; inner ceramic green sheets having interlayer-connecting via holes; an inner ceramic green sheet having a plurality of conductive coil patterns and a conductive lead pattern, and outer ceramic green sheets. The outer layers include three or more outer ceramic green sheets having a thickness that is less than that of the inner ceramic green sheets.

19 Claims, 6 Drawing Sheets

Sheet Composition Thickness (μm)□~number of sheet

MULTILAYER CERAMIC ELECTRONIC COMPONENT, MULTILAYER COIL COMPONENT AND PROCESS FOR PRODUCING MULTILAYER CERAMIC ELECTRONIC COMPONENT

BACKGROUND OF THE INVENTION

1. Field of the Invention

The present invention relates to monolithic ceramic electric components, laminated coil components, and methods of producing monolithic ceramic electric components.

2. Description of the Related Art

Figure 6:
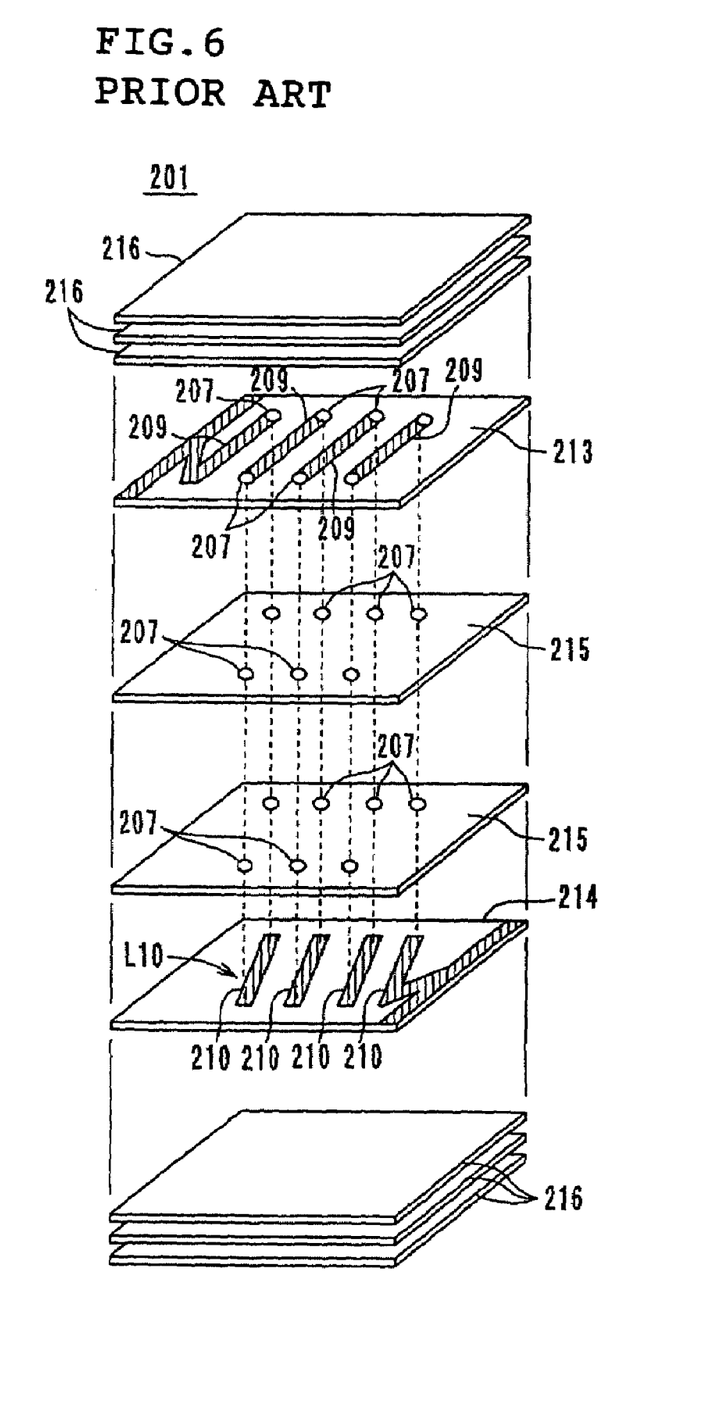
FIG. 6 is an exploded perspective view illustrating a known laminated coil component.

As a known monolithic ceramic electronic component, Japanese Unexamined Patent Application Publication No. 2002-252117, for example, discloses a laminated coil component. As shown in FIG. 6, a laminated coil component 201 includes inner ceramic green sheets 213 and 214 having conductive coil patterns 209 and 210 disposed on the respective surfaces, inner ceramic green sheets 215 having interlayer-connecting via holes 207, and outer ceramic green sheets 216. In general, the inner ceramic green sheets 213 to 215 and the outer ceramic green sheets 216 have the same thickness.

Figure 7:
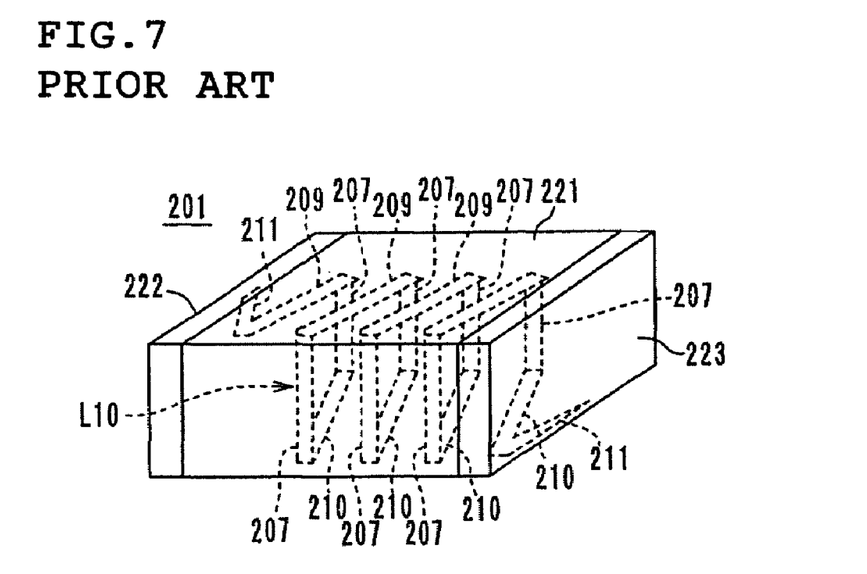
FIG. 7 is a schematic perspective view of the laminated coil component shown in FIG. 6.

These ceramic green sheets 213 to 216 are laminated and compacted to form a laminate 221 shown in FIG. 7. The laminate 221 is then fired, and input-output external electrodes 222 and 223 are formed on the fired laminate 221.

The conductive coil patterns 209 and 210 are electrically connected in series through the interlayer-connecting via holes 207 to form a helical coil L10 inside the laminate 221. This laminated coil component 201 includes the helical coil L10 having a coil axis that is perpendicular to the lamination direction of the laminate 221, and the input-output external electrodes 222 and 223 electrically connected to both ends of the helical coil L10 and disposed at the left and the right sides of the laminate 221. Accordingly, the laminated coil component 201 is referred to as a "vertically laminated and horizontally wound" coil component.

Moreover, Japanese Unexamined Patent Application Publication No. 2002-134355 discloses a laminated electronic component including thick outer ceramic green sheets to produce outer layers having a predetermined thickness with a minimized number of sheets.

In general, the surfaces of the input-output external electrodes on the monolithic ceramic electronic components are plated with, for example, Ni and Sn for improving solderability.

Figure 8:
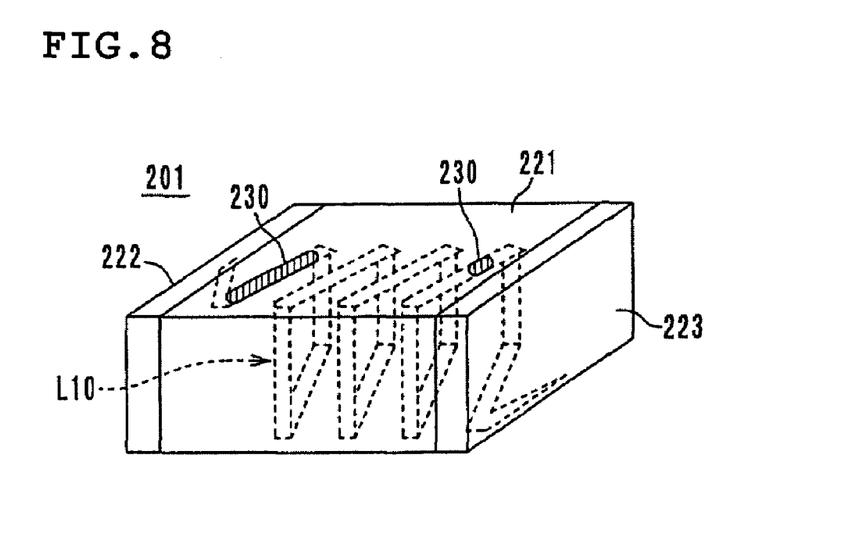
FIG. 8 is a schematic perspective view illustrating improper plating on the laminated coil component shown in FIG. 6.

However, when the input-output external electrodes 222 and 223 on the laminated coil component 201 are plated with, for example, Ni and Sn, improper plating of Ni or Sn sometimes occurs at undesirable portions of the laminated coil component 201. Specifically, as shown in FIG. 8, undesirable plating films 230 are deposited on the surfaces of the laminate 221 adjacent to the conductive coil patterns 209 and 210 that function as internal electrodes.

The cause of the improper plating is low insulating resistance between the surfaces of the laminate 221 and the conductive coil patterns 209 and 210. Therefore, in order to prevent the improper plating, the thicknesses of the outer layers including the outer ceramic green sheets 216 are set to 150 μm or more to increase the insulating resistance.

However, the diameter of the helical coil L10 must be maximized to achieve high impedance when the component is small in size. In other words, the number of inner ceramic green sheets 215 having interlayer-connecting via holes 207 must be maximized, whereas the outer layers must be minimized.

SUMMARY OF THE INVENTION

In order to overcome the problems described above, preferred embodiments of the present invention provide a small monolithic ceramic electronic component, a laminated coil component, and a method of producing the monolithic ceramic electronic component that can prevent improper plating.

According to a preferred embodiment of the present invention, a monolithic ceramic electronic component includes:

(a) a device portion including a plurality of inner ceramic layers and a plurality of internal electrodes; and (b) outer-layer portions each including a plurality of outer ceramic layers and disposed on the top and the bottom of the device portion, wherein (c) each of the outer-layer portions includes three or more outer ceramic layers, and the thickness of each of the outer-layer portions is less than that of the inner ceramic layers.

Moreover, the laminated coil component according to a preferred embodiment of the present invention includes:

(d) a coil portion including a plurality of inner ceramic layers and a plurality of coil conductors;

(e) a coil defined at the coil portion by the coil conductors being electrically connected to each other; and (f) outer-layer portions each including a plurality of outer ceramic layers and disposed on the top and the bottom of the coil portion, wherein (g) each of the outer-layer portions includes three or more outer ceramic layers, and the thickness of each of the outer-layer portions is less than that of the inner ceramic layers.

The insulating resistance between the interfaces of the outer ceramic layers is high in the outer layers since impurities are separated or materials are partially segregated onto the surfaces of the outer ceramic layers to increase the insulating resistance of the surfaces. Accordingly, even if the outer ceramic layers are thin, lamination of three or more outer ceramic layers can still achieve high insulating resistance that is sufficient for practical applications.

A ceramic material including at least one of chlorine, sulfur, and sodium as an impurity, or a ceramic material including at least one of chlorine, sulfur, and sodium as an additive for improving a certain property is preferably used as a material for the outer ceramic layers.

Furthermore, a method of producing a monolithic ceramic electronic component according to a preferred embodiment of the present invention includes the steps of:

(h) forming internal electrodes on the surfaces of inner ceramic sheets;

(i) forming a ceramic laminate by compacting a device portion and outer-layer portions disposed on the top and the bottom of the device portion, the device portion including a plurality of the inner ceramic sheets, the outer-layer portions each including three or more outer ceramic sheets having a thickness that is less than that of the inner ceramic sheets; and (j) forming external electrodes on the ceramic laminate.

Therefore, according to various preferred embodiments of the present invention, since the outer layers include three or more outer ceramic sheets having a thickness that is less than that of the inner ceramic sheets, the low-profile monolithic ceramic electronic component with no improper plating can be produced.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Preferred embodiments of a monolithic ceramic electronic component, a laminated coil component, and a method of producing the monolithic ceramic electronic component according to the present invention will now be described with reference to the attached drawings.

Figure 1:
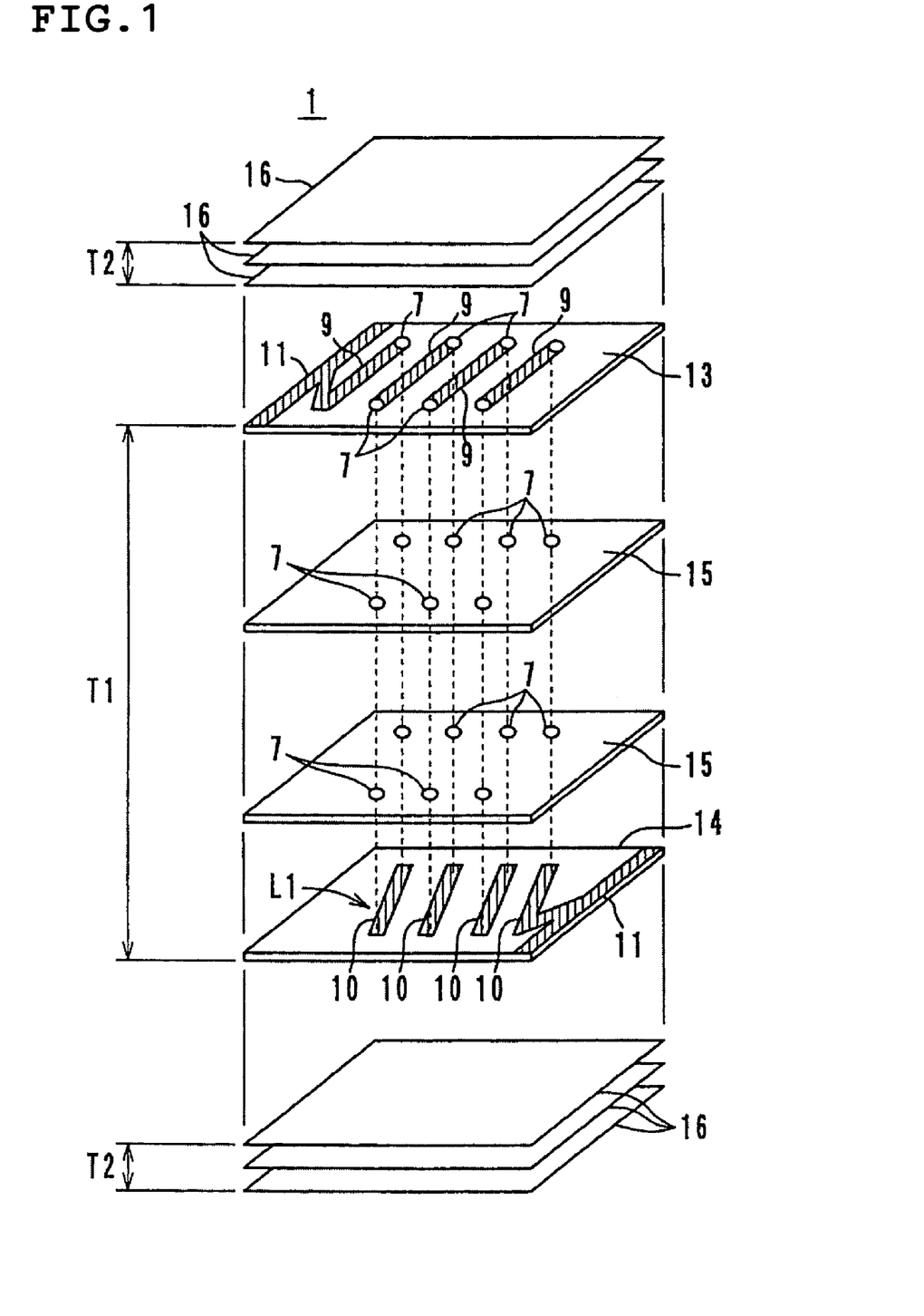
FIG. 1 is an exploded perspective view illustrating a first preferred embodiment of the laminated coil component according to the present invention.
Figure 2:
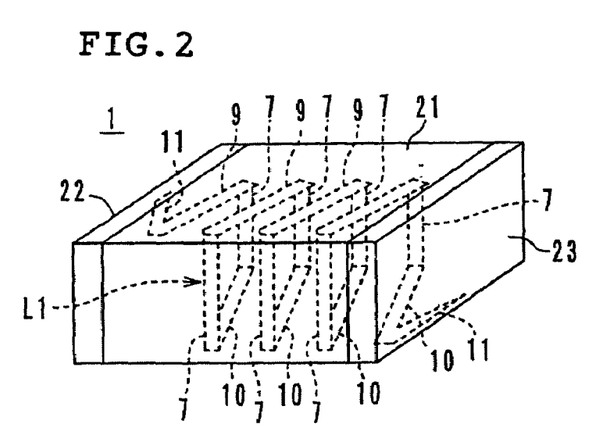
FIG. 2 is a schematic perspective view of the laminated coil component shown in FIG. 1.
Figure 3:
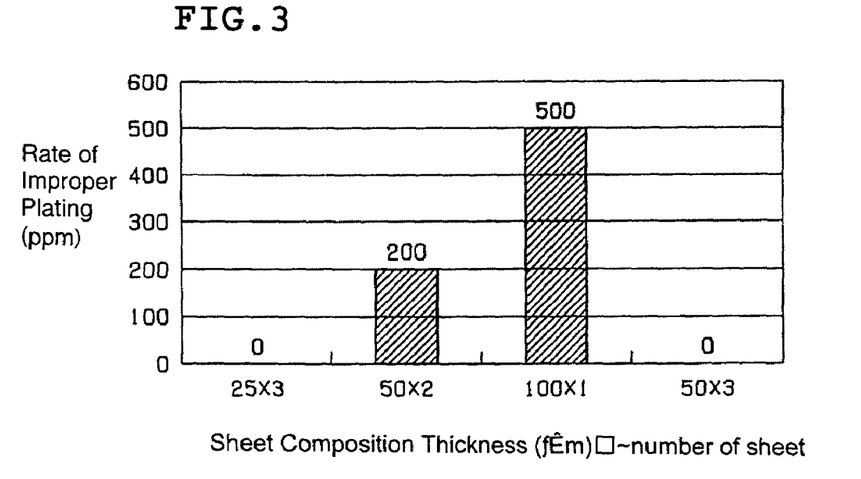
FIG. 3 is a graph illustrating the rate of improper plating.

First Preferred Embodiment (FIGS. 1 to 3)

As shown in FIG. 1, a laminated coil component 1 preferably includes an inner ceramic green sheet 13 having a plurality of conductive coil patterns 9, a conductive lead pattern 11, and interlayer-connecting via holes 7, inner ceramic green sheets 15 having interlayer-connecting via holes 7, an inner ceramic green sheet 14 having a plurality of conductive coil patterns 10 and a conductive lead pattern 11, and outer ceramic green sheets 16.

Each of the ceramic green sheets 13 to 16 is preferably produced by sheeting a compound of, for example, binding agents and Fe—Ni—Cu-based ferrite powder or dielectric powder by a doctor blade process or other suitable process. The conductive coil patterns 9 and 10, and the conductive lead pattern 11 preferably include, for example, Ag, Pd, Cu, Au or an alloy thereof, and are formed by screen printing or other suitable method. The interlayer-connecting via holes 7 are preferably formed by laser beams or other suitable process, and are filled with conductive paste including, for example, Ag, Pd, Cu, Au, or an alloy thereof, the conductive paste for forming coil conductors.

The conductive coil patterns 9 and the conductive coil patterns 10 are arranged substantially in parallel on the sheets 13 and 14, respectively. The interlayer-connecting via holes 7 have central axes extending in the direction along which the sheets 13 to 16 are laminated, and are linked together. By electrically connecting the ends of the conductive coil patterns 9 and the ends of the conductive coil patterns 10 through the interlayer-connecting via holes 7, the conductive coil patterns 9 and the conductive coil patterns 10 are alternately and electrically connected in series to define a helical coil L1.

Both ends of the helical coil L1 are electrically connected to the conductive lead patterns 11. The conductive lead patterns 11 are exposed at the left side and the right side of the sheets 13 and 14, respectively.

The sheets 13 to 16 are laminated and compacted, and then integrally fired to form a substantially rectangular laminate 21 shown in FIG. 2. Input-output external electrodes 22 and 23 are formed at the left and the right sides of the laminate 21. The external electrodes 22 and 23 are preferably formed by coating and baking, sputtering, vapor deposition, or other suitable process. The external electrodes 22 and 23 are connected to the respective conductive lead patterns 11. Furthermore, the surfaces of the external electrodes 22 and 23 are preferably plated with, for example, Ni and Sn for improving solderability and other characteristics.

The laminated coil component 1 having the above-described structure includes the laminate 21, and the helical coil L1 having a coil axis that is substantially perpendicular to the lamination direction of the laminate is disposed inside the laminate 21. The input-output external electrodes 22 and 23 are electrically connected to both ends of the helical coil L1, and are disposed at the left and the right sides of the laminated coil component 1. Accordingly, the laminated coil component 1 is referred to as a "vertically laminated and horizontally wound" coil component.

Prototypes of the laminated coil component 1 were produced by changing the thickness and number of the outer ceramic green sheets 16. The dimensions of the laminated coil component 1 were, for example, about 1.6 mm long by about 0.8 mm wide. The thickness T1 along the lamination direction of the inner ceramic green sheets 13 to 15 that define a coil portion was about 600 μm.

The rate of improper plating was measured for each prototype of the laminated coil component 1. FIG. 3 shows the experimental results. According to this graph, even though the thickness T2 of outer layers was the same, the rate of the improper plating was decreased by laminating a plurality of thin outer ceramic green sheets 16 (compare the case laminating two outer ceramic green sheets which have a thickness of about 50 μm with the case having only one outer ceramic green sheet having a thickness of about 100 μm). This was because the insulating resistance on the surfaces was increased due to impurity separation on the surfaces or partial segregation of materials that occurred when the outer ceramic green sheets 16 were fired.

Accordingly, even if the outer ceramic green sheets were thin, lamination of the outer ceramic green sheets could achieve high insulating resistance that is sufficient for practical applications at the interfaces. No improper plating was observed when three outer ceramic green sheets each having a thickness of about 25 μm were laminated and when three outer ceramic green sheets each having a thickness of about 50 μm were laminated.

In other words, the insulating resistance between the surfaces of the laminate 21 and the conductive coil patterns 9 and 10 was rot necessarily in proportion to the thickness T2 of the outer layers. When three or more outer ceramic green sheets 16 were laminated, high insulating resistance could be achieved even if the outer ceramic green sheets 16 were thin. Therefore, a laminated coil component 1 having a lower profile compared to the known laminated coil component 201 shown in FIG. 6 can be produced by laminating three or more outer ceramic green sheets 16 having a thickness that is less than that of the inner ceramic green sheets 13 to 15. No improper plating is observed in this laminated coil component 1.

In order to achieve higher insulating resistance on the surfaces of the outer ceramic green sheets 16, a ceramic material containing impurities, or a ceramic material containing at least one of chlorine, sulfur, and sodium as an additive for improving a certain property may be used as a material for the outer ceramic green sheets 16.

For example, when a material for the outer ceramic green sheets 16 includes about 10 ppm to about 600 ppm of chlorine or sulfur as an impurity, the outer ceramic green sheets 16 include about 5 ppm to about 150 ppm of chlorine or sulfur (impurity) after firing. When about 30 ppm to about 120 ppm of sodium is included, the outer ceramic green sheet 16 includes about 5 ppm to about 100 ppm of sodium (impurity) after firing. These impurities are segregated onto the surface of the outer ceramic green sheet 16 after firing to increase the insulating resistance.

Figure 4:
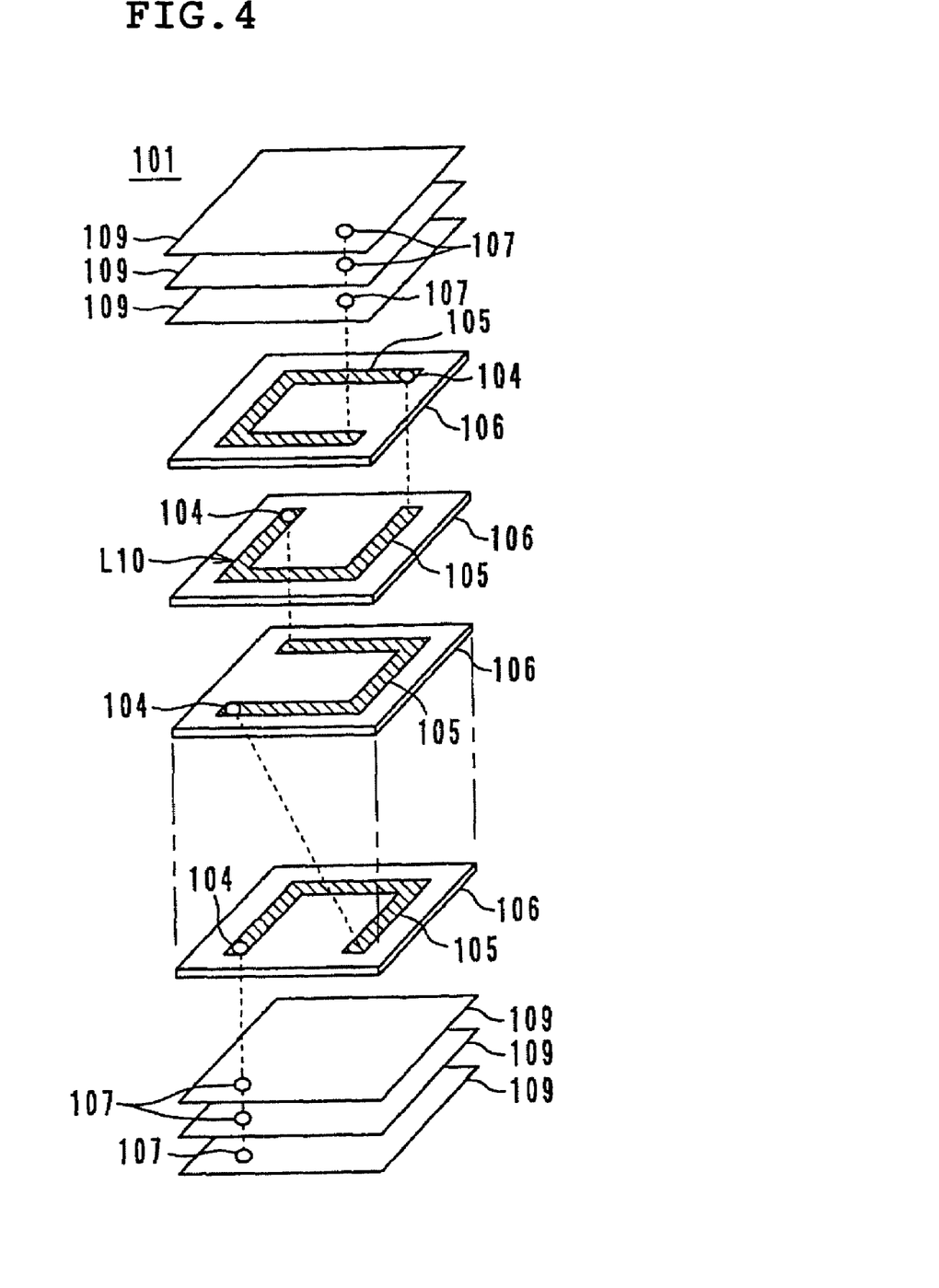
FIG. 4 is an exploded perspective view illustrating a second preferred embodiment of the laminated coil component according to the present invention.
Figure 5:
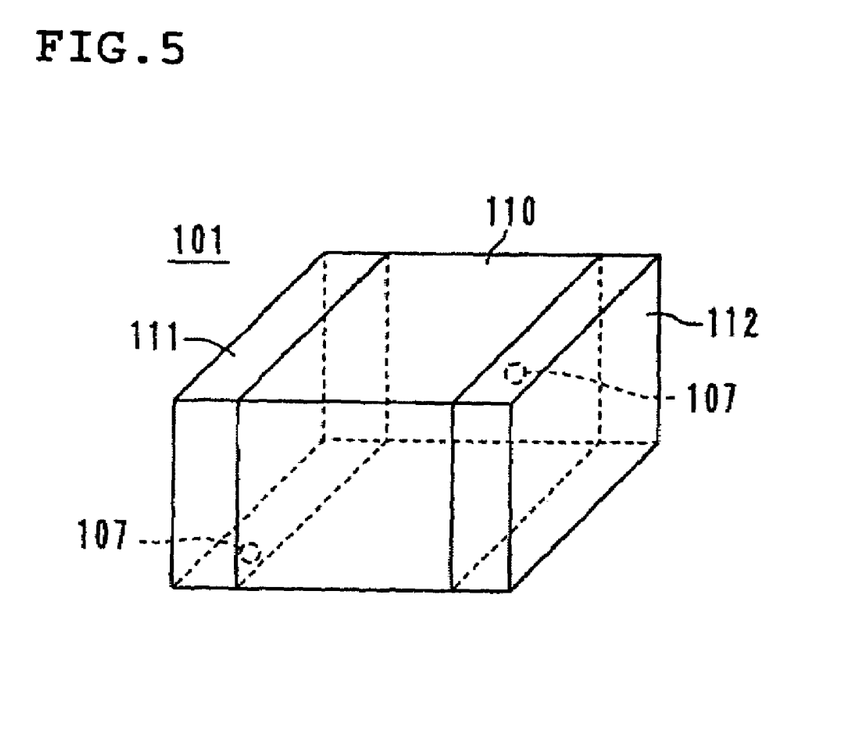
FIG. 5 is a schematic perspective view of the laminated coil component shown in FIG. 4.

Second Preferred Embodiment (FIGS. 4 and 5)

As shown in FIG. 4, a laminated coil component 101 according to a second preferred embodiment preferably includes inner ceramic green sheets 106 having conductive coil patterns 105 and interlayer-connecting via holes 104, and outer ceramic green sheets 109 having lead via holes 107. The sheets 106 and 109 are laminated and compacted to form a laminate 110 (shown in FIG. 5). The laminate 110 is then fired, and input-output external electrodes 111 and 112 are formed.

The conductive coil patterns 105 are electrically connected in series through the interlayer-connecting via holes 104 to define a helical coil L10 inside the laminate 110. This laminated coil component 101 includes the helical coil L10 having a coil axis that is substantially parallel to the lamination direction of the laminate 110, and the input-output external electrodes 111 and 112 electrically connected to both ends of the helical coil L10 and disposed at the left and the right sides of the laminate 110. Accordingly, the laminated coil component 101 is referred to as a "vertically laminated and vertically wound" coil component.

This laminated coil component 101 has the outer layers produced by laminating three or more outer ceramic green sheets 109 having a thickness that is less than that of the inner ceramic green sheets 106. Accordingly, a low-profile laminated coil component 101 with no improper plating can be produced.

OTHER PREFERRED EMBODIMENTS

The present invention is not limited to the above-described preferred embodiments, and various modifications are within the scope of the present invention.

Besides the laminated coil components, monolithic ceramic electronic components include laminated impedance components, laminated LC filters, multilayer capacitors, laminated transformers, and other similar components.

The laminated coil components may be of a "horizontally laminated and horizontally wound" type, which has the input-output external electrodes 111 and 112 disposed on the top and the bottom of the laminate 110 having a structure shown in FIG. 4, and is laid on its side when used.

In the above-described preferred embodiments, the components are preferably individually produced, however, a mother laminated block including a plurality of laminated coil components may be produced for mass production.

Furthermore, in the above-described preferred embodiments, the dimensions of the laminated coil components preferably are about 1.6 mm by about 0.8 mm, for example. However, the same effects can be achieved with coil components having different dimensions.

The method of producing a monolithic ceramic electronic component does not necessarily include a step of laminating ceramic sheets that have conductive patterns and via holes, and a subsequent step of integrally firing the sheets. The monolithic ceramic electronic component may be produced by the following steps: ceramic paste is applied by a process such as printing to form a ceramic layer. Conductive paste is applied onto the ceramic layer to form conductive patterns and via holes. Ceramic paste is applied thereon to form another ceramic layer. In this manner, a multilayer ceramic electronic component can be produced by alternately recoating.

As described above, the present invention relates to monolithic ceramic electronic components, laminated coil components, and methods of producing the monolithic ceramic electronic components, and achieves particular advantages of preventing improper plating, and of reducing the profile of the components.

It should be understood that the foregoing description is only illustrative of the present invention. Various alternatives and modifications can be devised by those skilled in the art without departing from the present invention. Accordingly, the present invention is intended to embrace all such alternatives, modifications, and variations that fall within the scope of the appended claims.

The invention claimed is:

1. A monolithic ceramic electronic component, comprising:
   a device portion including a plurality of inner ceramic layers and a plurality of internal electrodes; and
   outer-layer portions disposed on the top and the bottom of the device portion; wherein
   each of the outer-layer portions includes at least three outer ceramic layers, and the thickness of each of the at least three outer ceramic layers is less than that of each of the plurality of inner ceramic layers.

2. The laminated coil component according to claim 1, wherein the plurality of inner ceramic layers and the at least three outer ceramic layers include a magnetic substance.

3. The monolithic ceramic electronic component according to claim 1, wherein the plurality of outer ceramic layers includes a ceramic material including at least one of chlorine, sulfur, and sodium.

4. The monolithic ceramic electronic component according to claim 1, wherein the internal electrodes include conductive coil patterns connected to each other by interlayer-connecting via holes.

5. The monolithic ceramic electronic component according to claim 4, wherein the interlayer-connecting via holes are filled with conductive paste.

6. The monolithic ceramic electronic component according to claim 5, wherein the internal electrodes and the conductive paste includes at least one of Ag, Pd, Cu, Au, and an alloy thereof.

7. The monolithic ceramic electronic component according to claim 1, wherein the device portion includes a helical coil.

8. The monolithic ceramic electronic component according to claim 1, wherein external electrodes are disposed on opposite end surfaces of the component and surfaces of the external electrodes are plated with at least one of Ni and Sn.

9. The monolithic ceramic electronic component according to claim 1, wherein the component is one of a vertically laminated and horizontally wound coil component, a vertically laminated and vertically wound coil component, and a horizontally laminated and horizontally wound coil component.

10. The monolithic ceramic electronic component according to claim 1, wherein a thickness of each of the at least three outer ceramic layers is about 25 μm to about 50 μm.

11. A laminated coil component, comprising:
 a coil portion including a plurality of inner ceramic layers and a plurality of coil conductors;
 a coil defined in the coil portion by the coil conductors being electrically connected to each other; and
 outer-layer portions disposed on the top and the bottom of the coil portion; wherein
 each of the outer-layer portions includes at least three outer ceramic layers, and the thickness of each of the at least three outer ceramic layers is less than that of each of the plurality of inner ceramic layers.

12. The laminated coil component according to claim 11, wherein the plurality of inner ceramic layers and the at least three outer ceramic layers include a magnetic substance.

13. The laminated coil component according to claim 11, wherein the plurality of outer ceramic layers includes a ceramic material containing at least one of chlorine, sulfur, and sodium.

14. The monolithic ceramic electronic component according to claim 11, wherein the coil conductors are connected to each other by interlayer-connecting via holes.

15. The monolithic ceramic electronic component according to claim 14, wherein the interlayer-connecting via holes are filled with conductive paste.

16. The monolithic ceramic electronic component according to claim 15, wherein the coil conductors and the conductive paste includes at least one of Ag, Pd, Cu, Au, and an alloy thereof.

17. The monolithic ceramic electronic component according to claim 11, wherein external electrodes are disposed on opposite end surfaces of the component and
 surfaces of the external electrodes are plated with at least one of Ni and Sn.

18. The monolithic ceramic electronic component according to claim 11, wherein the component is one of a vertically laminated and horizontally wound coil component, a vertically laminated and vertically wound coil component, and a horizontally laminated and horizontally wound coil component.

19. The monolithic ceramic electronic component according to claim 11, wherein a thickness of each of the at least three outer ceramic layers is about 25 μm to about 50 μm.

* * * * *